J. A. SCHWARZFISCHER.
DRAFT EQUALIZER.
APPLICATION FILED JUNE 6, 1913.
1,079,887. Patented Nov. 25, 1913.
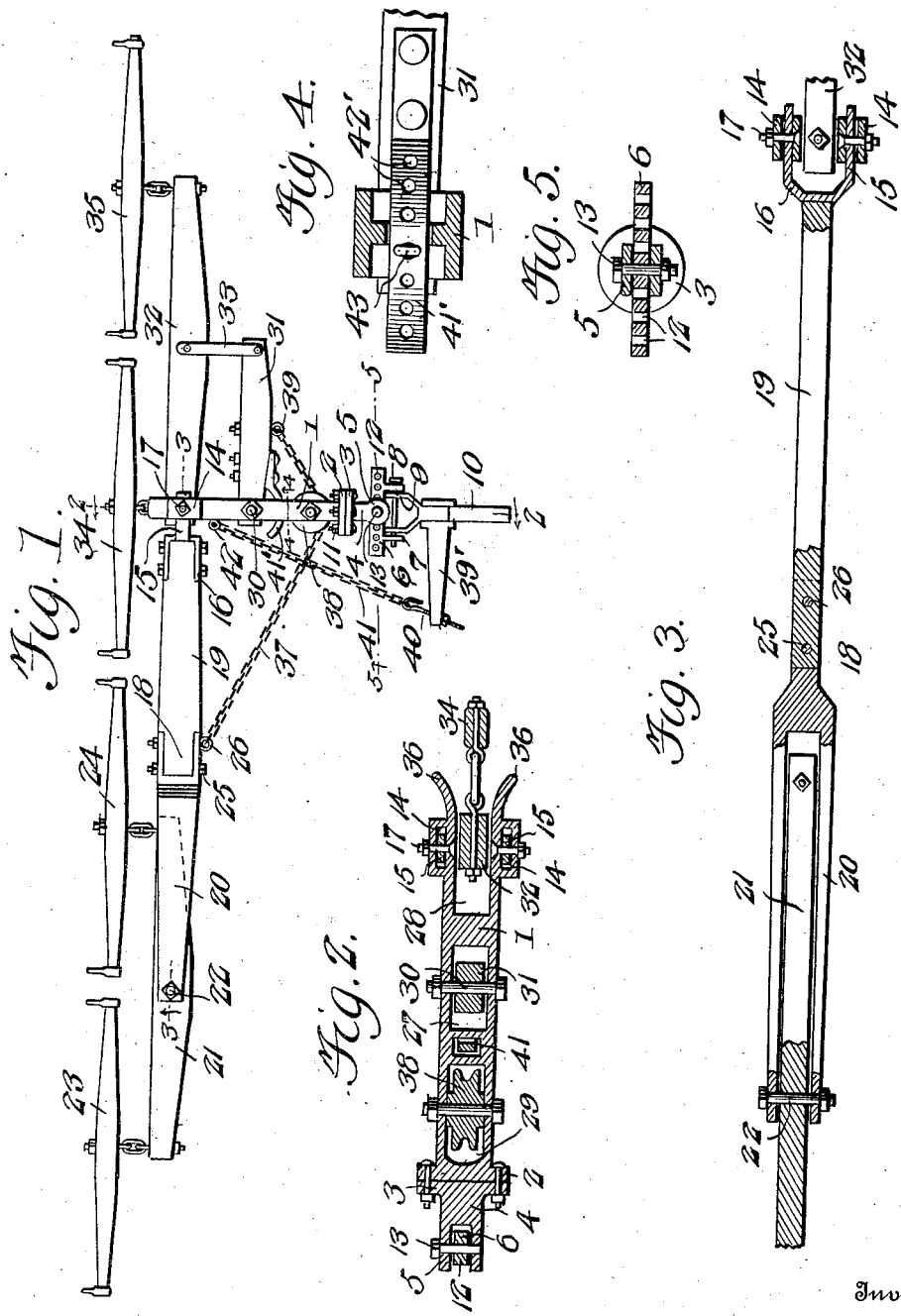
Witnesses
Hugh H. Ott
C. C. Hines
Inventor
John A. Schwarzfischer
By Victor J. Evans
Attorney

UNITED STATES PATENT OFFICE.

JOHN A. SCHWARZFISCHER, OF POCASSET, OKLAHOMA.

DRAFT-EQUALIZER.

1,079,887.

Specification of Letters Patent.

Patented Nov. 25, 1913.

Application filed June 6, 1913. Serial No. 772,149.

*To all whom it may concern:*

Be it known that I, JOHN A. SCHWARZ-FISCHER, a citizen of the United States, residing at Pocasset, in the county of Grady and State of Oklahoma, have invented new and useful Improvements in Draft-Equalizers, of which the following is a specification.

This invention relates to a four-horse draft equalizer, the primary object of the invention being to provide an equalizer or evener adapted to be detachably and reversibly applied to a right or left hand plow to facilitate the operation of the plow as required, to plow deep in soft or hard ground without unduly fatiguing or straining the draft animals, and in such a manner as to allow one horse to walk in the furrow and the other three on unbroken ground.

A further object of the invention is to provide an equalizer of the character described which facilitates the turning of the plow under the power of the single draft animal on one side of the draft line in conjunction with the power of the animal arranged in the direct line of draft, as well as to prevent tendency of the equalizer to swing laterally under the power of the major number of draft animals on the other side of the line of draft.

A still further object of the invention is to provide an equalizer of the character described which is simple of construction adapted for use in connection with plow beams which vary in length, and which is adapted to be adjustably attached to the plow beam by either a vertical or horizontal clevis.

The invention consists of the features of construction, combination and arrangement of parts hereinafter fully described and claimed, reference being had to the accompanying drawing, in which:—

Figure 1 is a top plan view of an equalizer embodying my invention. Fig. 2 is a vertical longitudinal section on the line 2—2 of Fig. 1. Fig. 3 is a vertical transverse section on the line 3—3 of Fig. 1. Figs. 4 and 5 are detail transverse sections on the lines 4—4 and 5—5 of Fig. 1.

Referring to the drawing, 1 designates a draft bar having at its rear end a cylindrical head 2 adapted to abut against a similar head 3 on a coupling bracket 4. This bracket 4 has a forked or bifurcated arm 5 arranged to receive a clevis consisting of a horizontal transverse plate 6 provided with fork arms 7 for pivotal coupling engagement by a pin or bolt 8 with fork arms 9 upon the forward end of the plow beam 10. The heads 2 and 3 are perforated for the reception of fastening bolts 11, and the clevis plate 6 is provided with a longitudinal series of apertures 12 adapted to receive a pivotal bolt 13 passing through the forks of the arm 5. This construction of connection between the bracket 4 and clevis 6 adapts the draw bar 1 to be adjusted laterally with relation to the plow beam to properly regulate the line of draft, and by means of the heads 2 and 3 and bolts 13 the equalizer as a whole may be, by giving it a half revolution, shifted for right or left hand use, as will be readily understood.

The forward end of the bar 1 is provided with slotted top and bottom portions, 14, receiving fork arms 15 on a bracket member 16, which fork arms are pivotally connected to the bar by bolts 17, to the bracket member 16 is bolted or otherwise fastened the inner end of a long lever 18 comprising transverse inner and outer sections 19 and 20, the outer section 20 having a doubletree 21 pivoted thereto at its outer end, as indicated at 22 to the opposite ends of which doubletree are attached, swingletrees 23 and 24. As shown, the sections 19 and 20 of the lever 18 are united by an ordinary fastening bolt 25 and an eye-bolt 26.

The bar 1 is provided with horizontal transverse slots 27, 28 and 29 and pivotally mounted at its inner end in the slot 27 on a pivot bolt 30 is a short draft lever 31 arranged on the opposite side of the draft bar from the long draft lever 18. A doubletree 32 is pivotally connected by links 33 with the outer end of the lever 31 and carries at its opposite ends swingletrees 34 and 35. The inner end of the doubletree 32 is movable in the slot 28 in the forward end of the bar 1, which slot is open at its forward end, the upper and lower bifurcated portions of the bar being curved or bent divergently as at 36, and the heads of the bolts 17 being countersunk in such portions of the bar, to permit the said inner end of the doubletree 32 to have free movement in said slot.

The swingletree 34 is arranged directly in the line of draft, and the swingletrees 23 and 24 are arranged equidistantly from pivot 22, while the swingletrees 24 and 35 are arranged a like distance on opposite sides of the bar 1, the construction and disposition of the parts of the draft appliance being such that in the operation of the plow one draft animal will walk in a furrow and the other three draft animals on unbroken ground.

An equalizer chain or connection 37 passes around a pulley 38 journaled in the slot 29 and is connected at one end with the eye of the bolt 26 of the lever 18 and at its opposite end with an eye bolt 39 carried by the lever 31 at a point intermediate of its ends. This chain or connection is thus coupled to the levers 18 and 31 at points equidistantly between the bar 1 and pivotal points of the levers and the points of attachment of the doubletree thereto, while the pivotal point of the lever 31 is disposed equidistantly between the pivot point of the lever 18 and the pulley 38, thus making the draft equal between the two teams on opposite sides of the draw bar.

An arm 39' is detachably fastened to the beam 10 and projects laterally therefrom at the same side as the long lever 18, and at the outer end of this arm 39' is a hooked screw bolt, 40, which has an adjustable threaded engagement with the arm. A chain or like element 41 is connected at its rear end to the hooked bolt and at its forward end to an eye 42 on the draw bar 1 at a point in rear of the pivot bolt 17. This chain restricts the tendency of the draw bar to swing laterally in the direction toward the short lever 31 owing to the pulling strain of the draft animals on the lever 18, thus rendering the connection 37 effective at all times. The arm 39' may be reversed for right or left hand use, and in applying the evener to plow beams where the distance varies between the eye bolt 42 and the point of attachment of the arm 39' to the beams, the chain 41 may be let out or taken up by engaging different links thereof with the bolt 40 or by adjusting the latter as occasion may require.

In order to facilitate the turning of the implement under the pull of the draft animals attached to the doubletree 32, when a turn is to be made to the left in the arrangement of the equalizer as shown in the present instance, the inner end of said lever 31 is provided with a curved or segmental arm 41' which extends slidably through the bar 1 and is provided with a series of perforations 42' to adjustably receive a stop pin 43. The arm 41' slides freely through the bar 1 but when the lever is pulled forward to a certain degree in the turning motion the pin 43 contacts with the bar and holds the lever from further forward motion, thus fixing it to the bar so that the pull of the draft animals attached to the doubletree 32 will be directly transmitted to the bar and beam to turn the implement around.

From the foregoing description taken in connection with the drawing, the construction and mode of operation of my improved four horse evener will be readily understood and it will be seen that a device of this character is provided which will efficiently perform the described functions, and which is simple of construction and capable of being employed upon any ordinary type of plow or other implement.

Having thus described my invention, I claim:

1. In a four horse evener, the combination of a draw bar, long and short levers pivotally attached to the bar at points in advance of each other and extending on opposite sides of the bar, an equalizing connection between said levers, draft devices carried by the levers, and a connection between the bar and short lever adapted to permit a certain degree of pivotal motion of said short lever and to positively and rigidly connect said lever with the bar when the lever is moved forward to a determined degree.

2. In a four horse draft evener, the combination of a beam, a clevis attached thereto, a bracket adjustably engaging said clevis, a draw bar reversibly connected with the bracket, long and short levers pivoted to the bar one in advance of the other and extending on opposite sides of the bar, an equalizing connection between said levers, an arm attached to the beam and projecting laterally therefrom on the long lever side, a flexible connection between said arm and the forward end of the bar, and a connection between the short lever and the bar adapted to permit independent swinging to a certain degree and to fix the lever to the bar on a determined forward movement of said lever.

In testimony whereof I affix my signature in presence of two witnesses.

JOHN A. SCHWARZFISCHER.

Witnesses:
  C. R. SCHWARZFISCHER,
  W. J. SMEDLEY.

---

Copies of this patent may be obtained for five cents each, by addressing the "Commissioner of Patents, Washington, D. C."